United States Patent [19]

Chopping et al.

[11] Patent Number: 4,984,236

[45] Date of Patent: Jan. 8, 1991

[54] CIRCUIT ARRANGEMENT FOR USE IN THE TIME DIVISION MULTIPLEXED SIGNALLING SYSTEM

[75] Inventors: Geoffrey Chopping; Andrew K. Borland, both of Dorset, England

[73] Assignee: Plessey company plc, Ilford, United Kingdom

[21] Appl. No.: 296,726

[22] Filed: Jan. 13, 1989

Related U.S. Application Data

[63] Continuation-in-part of Ser. No. 146,880, Jan. 22, 1988, abandoned.

[30] Foreign Application Priority Data

Feb. 20, 1987 [GB] United Kingdom ................ 8703983

[51] Int. Cl.$^5$ ............................................... H04J 3/06
[52] U.S. Cl. .............................. 370/100.1; 370/110.1; 375/111
[58] Field of Search ................ 370/100.1, 110.1, 112; 375/110, 111, 113, 114

[56] References Cited

U.S. PATENT DOCUMENTS

| | | | |
|---|---|---|---|
| 3,924,080 | 12/1975 | Caldwell | 370/100.1 |
| 4,133,978 | 1/1979 | Hewlett, Jr. | 375/110 |
| 4,161,719 | 7/1979 | Parikh et al. | 370/100.1 |
| 4,247,936 | 1/1981 | Hustig | 370/100.1 |
| 4,740,998 | 4/1988 | House | 375/110 |
| 4,744,082 | 5/1988 | Fujimura et al. | 370/112 |
| 4,747,112 | 5/1988 | Blondeau, Jr. et al. | 370/100.1 |
| 4,787,095 | 11/1988 | Forth et al. | 375/114 |

FOREIGN PATENT DOCUMENTS

| | | |
|---|---|---|
| 0167849 | 1/1986 | European Pat. Off. . |
| 0664304 | 5/1979 | U.S.S.R. . |
| 1501608 | 2/1978 | United Kingdom . |
| 1563156 | 3/1980 | United Kingdom . |
| 2103053 | 2/1983 | United Kingdom . |

*Primary Examiner*—Douglas W. Olms
*Assistant Examiner*—Alpus H. Hsu
*Attorney, Agent, or Firm*—Fleit, Jacobson, Cohn, Price, Holman & Stern

[57] ABSTRACT

In a forty megabit per second TDM signalling system in which twenty 2 megabit per second signalling streams are combined, one of the twenty primary signalling streams is inverted by the circuit arrangement and substituted for one of the other signalling streams. By using adjacent channels the forty megabit signal stream has a guaranteed change of data at least once every twenty bits. The system facilitates clock recovery and synchronization in apparatus employing bi-phase mark encoded data.

3 Claims, 2 Drawing Sheets

CIRCUIT ARRANGEMENT FOR USE IN THE TIME DIVISION MULTIPLEXED SIGNALLING SYSTEM

FIELD OF THE INVENTION

The present invention relates to a circuit arrangement for use in a multiplexed signalling system and more particularly but not exclusively to time division multiplexed signalling system of the kind which carry biphase mark encoded data, and is a continuation-in-part application of U.S. patent application Ser. No. 146,880 filed Jan. 22, 1988, (abandoned).

DESCRIPTION OF THE PRIOR ART

Biphase mark encoding is a known method of combining clock and data signals into a single signal from which both clock and data can be recovered. To ensure synchronism between transmitting and receiving apparatus the receiving apparatus includes a clock recovery circuit in which a local clock signal is adjusted to a transmitted clock signal in dependence upon a change of data in the received bit stream.

To ensure correct operation of a clock recovery circuit it is necessary for a change of data to be guaranteed to occur at least once in every "n" bits in dependence on the system.

In time division multiplexing (TMD) systems there is usually only one channel in the multiplex in which any rate of change of data can be guaranteed in this channel, sometimes called the "sync" stream or "stream O" having a fixed pattern content. It is possible with small multiplex systems such as those having, say, a 2.048 megabit (hereinafter referred to as "two megabit") per second frame structure comprising thirty two time slots each having eight bits at a sixty-four kilo bit per second rate to provide clock extraction based on frame alignment signals. Such signals may be included in dedicated time slots although this is not necessarily so and a minimum rate of change of data cannot always be guaranteed.

More complex transmission frames may be made up of multiples of the "two-megabit" frames for example an 8.192 megabit per second serial multiplex may be made up from four bit interleaved two megabit frames. Such "eight megabit" frames may be further bit interleaved to provide 40.96 megabit per second data streams comprising twenty of the two megabit frames.

In a "forty megabit" data stream having only one timeslot (stream 0) in which any rate of change of data can be guaranteed (all other streams can, at least in theory, be of possible fixed level) the sense of received data can only be guaranteed to change once in every eighty received bits in the case where the sync stream is of the form "1P0P1P0P ---" the P's representing pattern sections of the sync stream. Thus when nineteen other two megabit streams are interleaved the form of the data multiplex is: 1, nineteen bits from other 2M channels, "P", nineteen bits from other 2M channels, 0, nineteen bits from other 2M channels, "P", ---.

Thus when the pattern (P) bits are zero and all other data is 0, the 40M stream becomes:-
"1", nineteen "0", P='0', nineteen '0', '0',
nineteen '0', P='0', nineteen '0', '1' giving seventy nine possible '0' bits between '1's of the sync stream.

Such a rate of change of data in a biphase mark encoded data TDM signalling system clearly may cause difficulties in clock recovery.

It will be appreciated that if stream 0 is devoted to "1010 ---" (that is not including any pattern bits), then a change of data may be guaranteed once every 40 bits. Such a rate of change may still prove inadequate to guarantee clock recovery.

STATEMENT OF THE OBJECT OF THE INVENTION

Therefore, it is an object of the present invention to provide circuit arrangement for use in a TDM signalling system in which the guaranteed rate of change of data is independent of stream 0.

According to the present invention there is provided a circuit arrangement for use in a time division multiplexed (TDM) signalling system of the kind transmitting frames of data, each such frame comprising data bits from n data streams interleaved in turn, wherein the arrangement comprises a first latch which receives a plurality of data streams in parallel, a second latch which receives the data streams in parallel from the first latch, a multiplexer which receives the data streams in parallel from the second latch and generates a bit interleaved output, characterised in that a selector is controlled to selectively pass a first output from the first latch to a first input of the second latch, or the inverse of a second output of the first latch to the first input of the second latch.

BRIEF DESCRIPTION OF THE DRAWINGS

An embodiment of the invention will now be described by way of example only with reference to the accompanying drawings wherein.

DESCRIPTION OF THE PREFERRED EMBODIMENT

Figure 1:
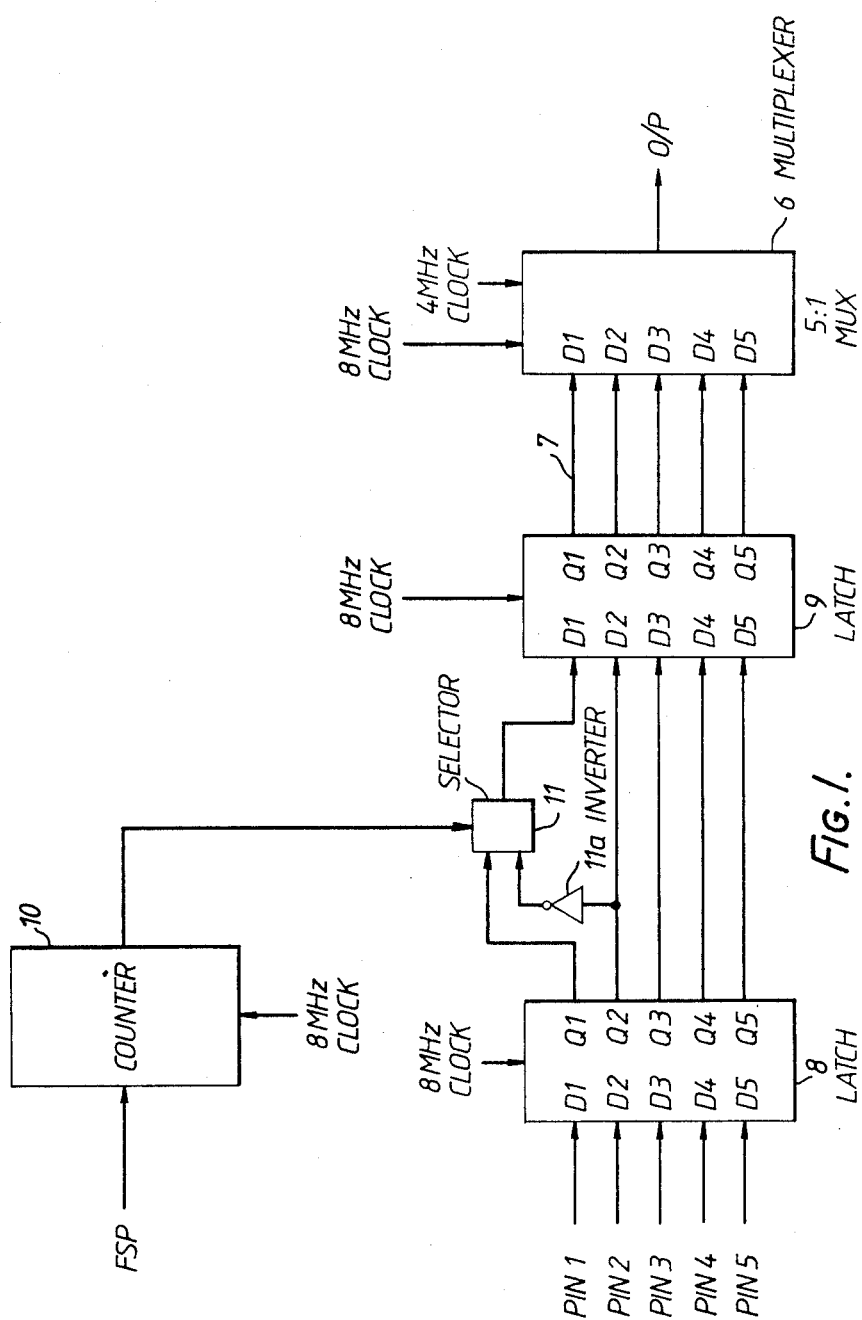
FIG. 1 shows a circuit arrangement according to the present invention; and, FIG. 2 shows the frame structure of the data streams.

In considering the invention, and referring to FIG. 1, it is assumed that a 40 megabit per second serial link multiplexer 6 receives five eight megabit per second signals in parallel on lines 7, by way of first and second stage D type latches 8, 9. The multiplexer 6 bit interleaves the eight megabit streams (which are accompanied by a frame marker pulse to provide bit identity within the streams) to produce the forty megabit per second signal at the output O/P. The relationship between the eight megabit signals is maintained.

Each of the eight megabit signals comprises four two megabit signals resulting in the 40 megabit stream comprising (effectively) 20 two megabit streams which for convenience are referred to hereinafter as streams 0 (zero) to 19.

Considering the arrival pattern of the twenty streams, bearing in mind that the relationship between the eight megabit streams is maintained and that the five streams are received on pins 1–5 at latch 9 and are fed in parallel by way of latch 9 to the multiplexer 6 then the bits arrive at the multiplexer input as follows:

| Multiplexer Input | | 1 | 2 | 3 | 4 | 5 |
|---|---|---|---|---|---|---|
| First Bit Period | (stream) | 0 | 1 | 2 | 3 | 4 |
| Second Bit Period | (stream) | 5 | 6 | 7 | 8 | 9 |
| Third Bit Period | (stream) | 10 | 11 | 12 | 13 | 14 |

-continued

| Multiplexer Input | | 1 | 2 | 3 | 4 | 5 |
|---|---|---|---|---|---|---|
| Fourth Bit Period | (stream) | 15 | 16 | 17 | 18 | 19 |

Now assuming that at least one spare bit stream is available one simple solution to clock recovery is to make the spare stream carry a continuously alternating signal (i.e. 1 - 0 - 1 - 0 ---). However, this solution only guarantees a bit change every forty bits in the forty megabit per second signal.

In a particular system related to the United Kingdom telecommunications exchange system known as System 'X' communication across boundaries between switches and between control signalling and switches and peripherals is by means of a forty megabit per second serial link and in this system the two megabit stream number 15 is a spare stream.

Accordingly, stream 15 could carry the aforementioned alternating signal. However, to increase the guaranteed rate of change the invention uses the inverse of adjacent one of the streams (0-14, 16-19) to guarantee a change of data once every twenty bits in the forty megabit per second stream.

Referring back to the table above it is convenient to select stream 16 for inversion since this stream arrives co-temporaneously with stream 15 at the forty megabit per second serial link multiplexer.

Inverting the adjacent stream guarantees a rate of change such that "there will be no more than 20 consecutive bits of the same sense in the 40 Mbit/s multiplex".

The required modification to a standard five input serial link multiplexer 6 is extremely simple, since such multiplexers have a control circuit and are supplied with a frame marker pulse FSP which coincides with a bit from a synchronisation stream (usually corresponding to stream '0'). Thus by causing the frame marker pulse FSP to set a counter 10, the counter 10 may be used to indicate the time at which streams 15 to 19 are presented, at which time the control circuit may replace the signal received at multiplexer input D1 with the inverse of the signal received at input D2.

The counter 10 is therefore used to provide a one bit wide decode signal that coincides with every occurrence of streams 15 to 19 on the outputs of the first latch 8.

This decode signal is used to control a selector 11 between the latches 8, 9 such that the D1 input of the latch 9 will receive the inverse of stream 16 by way of inverter 11a from the Q2 output of the latch 8 instead of stream 15 from the Q1 output of latch 8. At other times the output Q1 of latch 8 is fed to the input D1 of latch 9.

Figure 2:
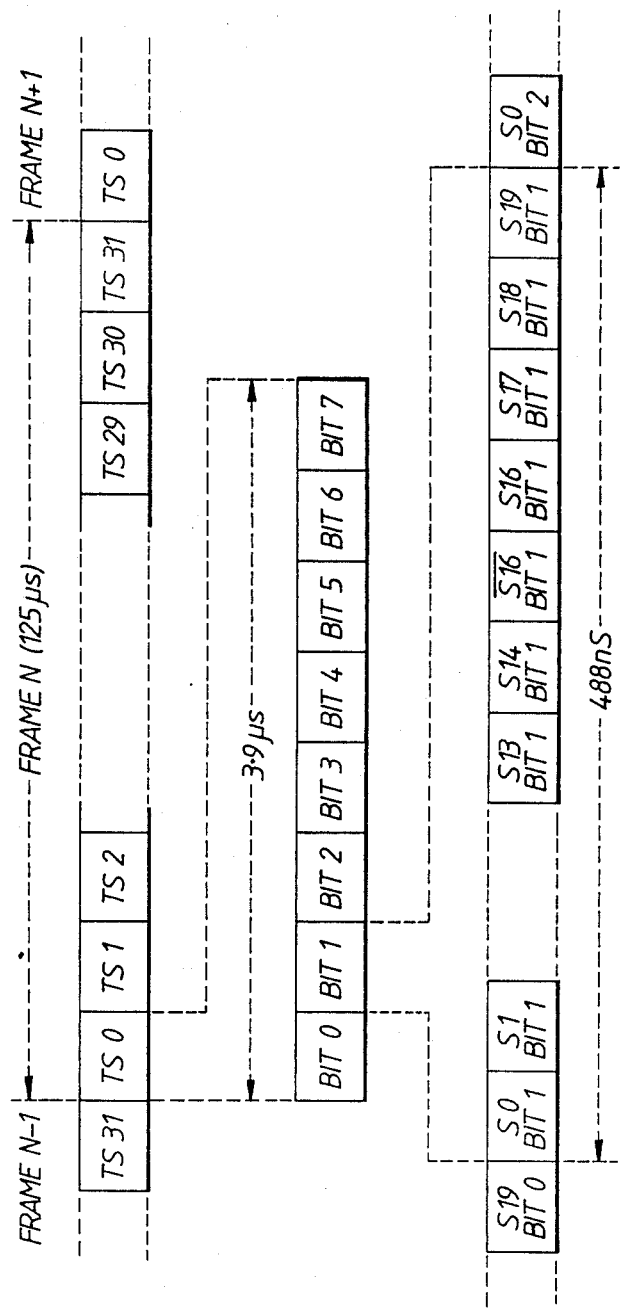

The Frame structure may now be seen by reference to FIG. 2. In the aforementioned System 'X' telephone exchange a 125 microsecond frame period is used, each frame providing for thirtytwo time slots (TS0-TS31). Each time slot is thus approximately 3.9 microseconds in duration.

In each time slot (e.g. Timeslot '0'), eight data bits are derived (for example eight - bit A-law encoded voice) each bit having a duration of approximately 488 nanoseconds. Each timeslot thus handles 64 kilo bits per second, the frame providing a two megabit per second (32×64k) data stream.

Eighteen such streams (S0-S4, S6-S14, S16-S19) carrying user data are combined with one two megabit stream of exchange control data (S5), and S16 is inverted to provide the missing megabit stream S15 to form the forty megabit stream. Thus in the 488 nano second bit period of the 64 kilobit stream, twenty bits are transmitted across exchange boundaries.

These twenty bits, assembled as shown, comprise corresponding bits from corresponding time slots of each stream. Thus time slot 0, bit 1 from stream S0 is followed by time slot 0, bit 1 from stream S1 and so on. Following time slot 0, bit 1 from stream S19, time slot 0, bit 2 from stream S0 is transmitted. Similarly following transmission of timeslot 0, bit 7 from stream S19, time slot 1, bit 0 from stream S0 is transmitted.

We claim:

1. A circuit arrangement for use in a time division multiplexed (TDM) signalling system of the kind transmitting frames of data each such frame comprising data bits from n data streams interleaved in turn, wherein the arrangement comprises a first latch which receives a plurality of data streams each on a respective input of the first latch, a second latch having a respective input connected to a respective output of the first latch, and a first input being controlled by a selector to selectively pass a first output from the first latch to a first input of the second latch, or the inverse of a second output of the first latch to the first input of the second latch and a multiplexer arranged to have a respective input connected to a respective output of the second latch.

2. A circuit arrangement as claimed in claim 1, characterised in that the selector is controlled by a counter receiving a frame start pulse, which generates a one bit wide decode signal for controlling the selector.

3. A circuit arrangement as claimed in claim 2, characterised in that the first output of the first latch is connected directly to a first input of the selector, and the second output of the first latch is connected to an inverter and to the second input of the second latch, the output of which is connected to a second input of the selector, and an output of the selector is connected directly to the first input of the second latch.

* * * * *